United States Patent [19]

Matsumoto

[11] Patent Number: 5,070,415
[45] Date of Patent: Dec. 3, 1991

[54] IMAGE READING APPARATUS HAVING A LOW FRICTION MEMBER BETWEEN THE CONVEYING ROLLER AND THE TRANSPARENT PLATE

[75] Inventor: Hiroaki Matsumoto, Yokohama, Japan

[73] Assignee: Canon Kabushiki Kaisha, Tokyo, Japan

[21] Appl. No.: 501,352

[22] Filed: Mar. 28, 1990

Related U.S. Application Data

[63] Continuation of Ser. No. 217,436, Jul. 11, 1988, abandoned.

[30] Foreign Application Priority Data

Jul. 14, 1987 [JP] Japan ............................ 62-108805[U]

[51] Int. Cl.⁵ ............................................... H04N 1/04
[52] U.S. Cl. ..................................... 353/482; 358/456; 358/498; 250/578
[58] Field of Search ............... 358/471, 474, 482, 483, 358/494, 496, 498; 250/578

[56] References Cited

U.S. PATENT DOCUMENTS

| 3,890,049 | 6/1975 | Collins et al. | 250/559 |
| 3,932,755 | 1/1976 | Sagawa | 250/349 |
| 4,200,391 | 4/1980 | Sakamoto et al. | 250/205 |
| 4,352,553 | 10/1982 | Hirahara | 250/205 |
| 4,438,918 | 3/1984 | Ito et al. | 271/251 |
| 4,446,364 | 5/1984 | Hayashi et al. | 358/482 |
| 4,544,258 | 10/1985 | Takano | 250/216 |
| 4,560,866 | 12/1985 | Takenouchi et al. | 250/573 |
| 4,729,036 | 3/1988 | Ikeda et al. | 358/296 |
| 4,743,975 | 5/1988 | Ijuin | 358/486 |
| 4,743,976 | 5/1988 | Katakabe et al. | 358/496 |
| 4,805,032 | 2/1989 | Watanabe et al. | 358/482 |

FOREIGN PATENT DOCUMENTS

57-188463 11/1982 Japan .
58-054169 3/1983 Japan .
58-127463 7/1983 Japan .

Primary Examiner—Edward L. Coles, Sr.
Attorney, Agent, or Firm—Fitzpatrick, Cella, Harper & Scinto

[57] ABSTRACT

An apparatus for reading an image of a sheet has conveying apparatus for conveying the sheet, a transparent member contacting a surface of the sheet conveyed by the conveying apparatus, and a photoelectric conversion element disposed on the transparent member or on the side opposite to the surface of the transparent member which contacts the surface of the sheet. A low friction portion is formed on that portion of the transparent member which contacts the conveying apparatus.

53 Claims, 7 Drawing Sheets

PRESSURE DISTRIBUTION WITHOUT
THE SMOOTHING PLATE OR COATING.

THERE IS A SHEET
OF DOCUMENT PAPER.

IMAGE READING APPARATUS HAVING A LOW FRICTION MEMBER BETWEEN THE CONVEYING ROLLER AND THE TRANSPARENT PLATE

This application is a continuation of application Ser. No. 217,436 filed July 11, 1988, now abandoned.

BACKGROUND OF THE INVENTION

1. Field of the Invention

This invention relates to an apparatus for reading images, such as characters formed on a sheet such as an original, while conveying the sheet, and in particular to a reading apparatus of the type which brings the sheet substantially into intimate contact with a reading portion.

Apparatuses of this type are often used, for example, in facsimile apparatuses or the like.

2. Related Background Art

An apparatus for reading the image of a sheet is disclosed, for example, in U.S. Pat. No. 4,438,918. In this apparatus, a sheet (an original) is fed along a predetermined conveyance path by a conveying roller. A slit is provided in the course of the conveyance path, and a light is applied to the original through the slit, and the reflected light is imaged on a photoelectric conversion element by a lens, whereby the image of the original is read. The photoelectric conversion element is disposed on a substrate in a direction perpendicular to the direction of conveyance of the original, receives the reflected light from the original, and converts it into an electrical signal.

In such an apparatus, however, the photoelectric conversion element can be disposed at a location within the apparatus into which it is difficult for outside light to enter, but a lens, a reflecting mirror, etc. are required, and this leads to bulkiness in the apparatus.

Also, an apparatus in which a lens array used to make the apparatus compact, and in which a photoelectric conversion element is disposed at a location near an original is disclosed in Japanese laid-Open Utility Model Application No. 57-188463. In an image reading apparatus using a lens array, the resolution is reduced unless the distance between the original and the lens array is kept constant. Therefore, in an image reading apparatus using a lens array in which an original is conveyed while being urged against a glass plate disposed at a predetermined distance from the lens array, the original is accurately positioned (see Japanese Laid-Open Utility Model Application No. 58-54169). The apparatus in which reading is effected with the original brought into contact with an image reading portion in this manner is called an "intimate contact type image reading apparatus".

In order to make such apparatus more compact, the assignee has developed a reading apparatus which does not use any lens but directly reads the image of an original using an image sensor. In this reading apparatus, a photoelectric conversion element is provided on a transparent plate disposed on a substrate having a hole therein for passing therethrough a light from a light source, and is covered with a protective transparent sheet. During the reading of the original, the photoelectric conversion element receives the reflected light of said light applied to the original being conveyed while being in contact with the protective transparent sheet, and converts it into an electrical signal.

In such an intimate contact type image reading apparatus, the original is conveyed while being urged against a reading portion by a roller in order that the original may be brought into intimate contact with the reading portion. Particularly, when the original is to be directly read by the photoelectric conversion element without the intermediary of a lens, if the original floats up even slightly from the protective transparent sheet, the resolving power will be reduced and the image will be blurred. To keep a high resolving power, use is made of a conveying roller for conveying the original while urging the original against the protective transparent sheet. Thus, when the original is not in the reading portion when the operation is started, the original conveying roller directly contacts the sensor. The reading portion of the sensor is constantly in frictional contact with the original and the conveying roller and therefore, the surface thereof is covered with a wear proof material. Also, it is indispensable for the surface of the reading portion to pass therethrough the reflected light from the original and therefore, a wear resisting layer chiefly composed of transparent glass is used as the surface of the recording portion.

The surface of this glass layer generally has a good property for intimate contact with the rubber surface of the conveying roller, and this means that the frictional force between the conveying roller and the glass layer is very great. Therefore, the motor for driving the conveying roller has been required to have a great output, and this has hampered the compactness and low cost of the apparatus.

Also, the use of a large motor of great torque would adversely affect other parts by the heat from the motor. There is a further problem of noise being produced when the glass and the conveying roller rub against each other.

Also, when a pulse motor is used as a drive source for the conveying roller and the original is fed in synchronism with the reading, there has been the possibility of unsatisfactory reading occurring due to deconditioning.

Furthermore, where the roller of the paper feeding portion and the conveying roller of the reading portion are driven by a common motor, there has been the problem that if the rotation of the conveying roller is stopped or becomes unstable due to the friction thereof with the glass, the rotation of the roller of the paper feeding portion also becomes unstable and paper feeding fails to take place.

SUMMARY OF THE INVENTION

It is the object of the present invention to eliminate the above-noted disadvantages peculiar to the prior art and to provide an intimate contact type image reading sensor which leads to the provision of a compact, simple image reading apparatus.

The present invention achieves the above object by providing, in an intimate contact type image reading sensor, a low friction member near a reading portion.

DESCRIPTION OF THE PREFERRED EMBODIMENTS

Some embodiments of the present invention will hereinafter be described with reference to the accompanying drawings.

Figure 1:
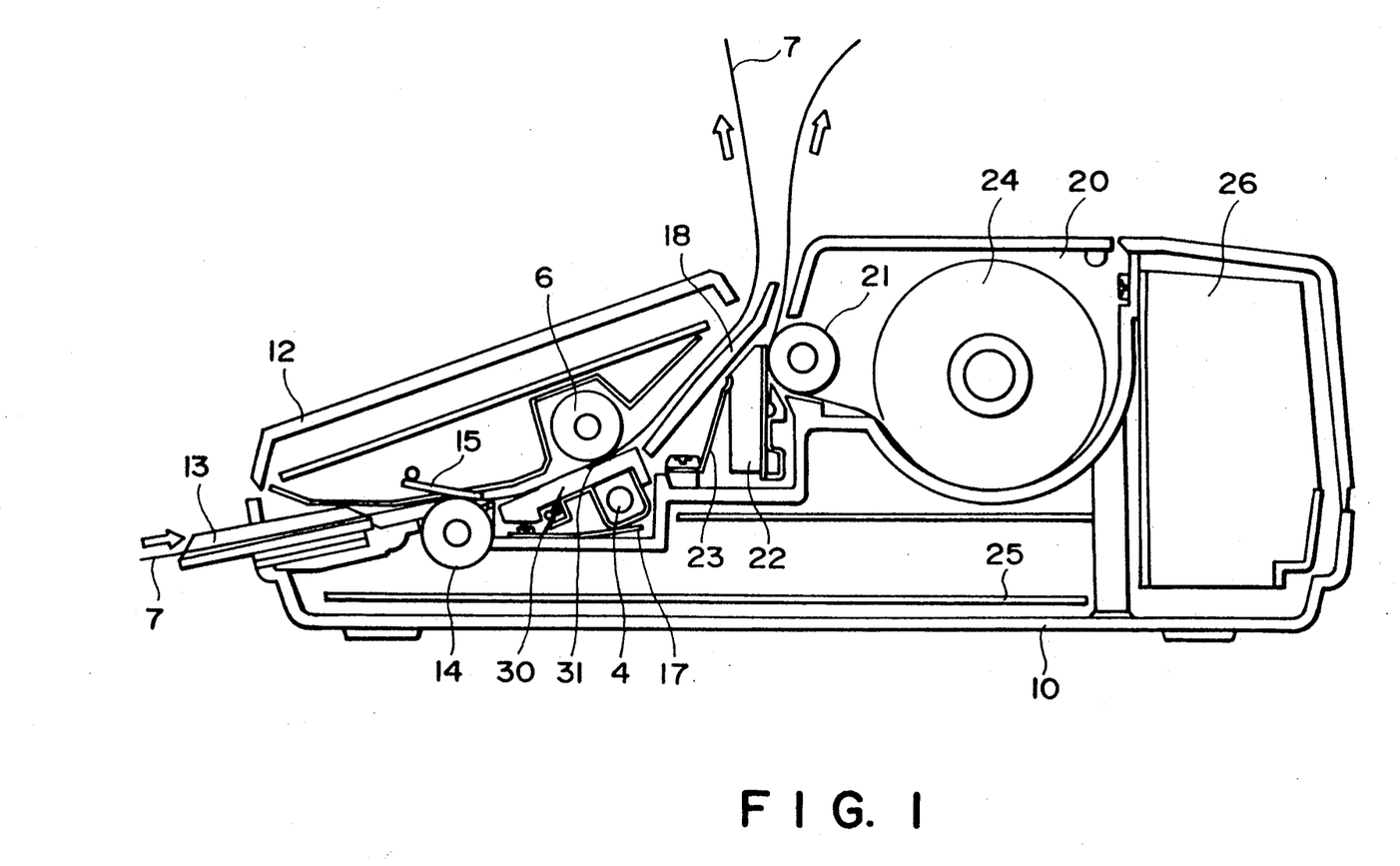
FIG. 1 is a cross-sectional view showing an embodiment of the present invention.

FIG. 1 is a cross-sectional view of a facsimile apparatus embodying the present invention.

In FIG. 1, the reference numeral 10 designates the frame member of the apparatus, and the reference numeral 12 denotes an operating panel. The reference numeral 13 designates a tray on which originals (sheets) are placed, the reference numeral 14 denotes a feed roller for feeding the originals, and the reference numeral 15 designates a separating piece for controlling by frictional force the movement of the originals other than the original fed by the feed roller 14, and separating them. The reference numeral 6 denotes a conveying roller, the reference numeral 30 designates image sensor means, and the reference numeral 31 denotes the reading portion thereof. The reference numeral 4 designates a xenon tube for illuminating the original, and the reference numeral 17 denotes a leaf spring for biasing image sensor means 30 and urging the conveying roller 6 against the reading portion 31. The reference numeral 18 designates a sheet guide. What has been described above is the construction of a reading system.

A recording system has a recording paper containing portion 20, a platen roller 21, a thermal head 22 urged against the platen roller by a leaf spring 23, etc. The reference numeral 24 designates a roll of recording paper, the reference numeral 25 denotes a circuit substrate, and the reference numeral 26 designates a power source.

Operation of the reading system will now be described.

The originals 7 placed on the tray 13 are separated one by one and fed by the rotating feed roller 14 and the separating piece 15. The original thus fed is nipped between the conveying roller 6 and the reading portion 31 of the image sensor means 30 and is fed by the rotation of the conveying roller 6 and at the same time, has its images successively read at the reading portion 31. The original 7 is then guided by the sheet guide 18 and discharged out of the apparatus.

Also, in the recording system, printing is effected by the thermal head 22 on the recording paper drawn out from the recording paper containing portion 20 by the platen roller 21.

Figure 2:
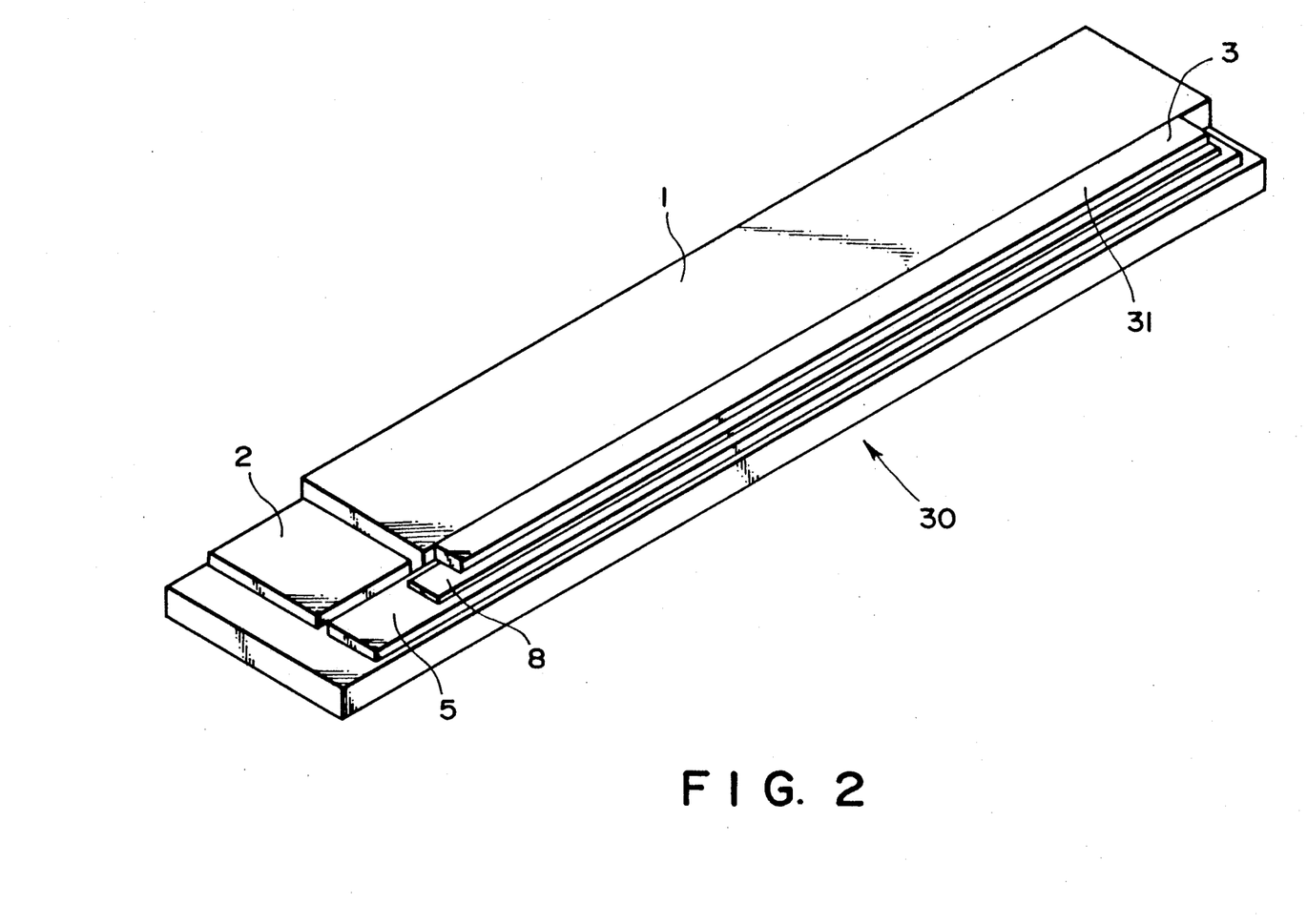
FIG. 2 is a perspective view of image sensor means.
Figure 3:
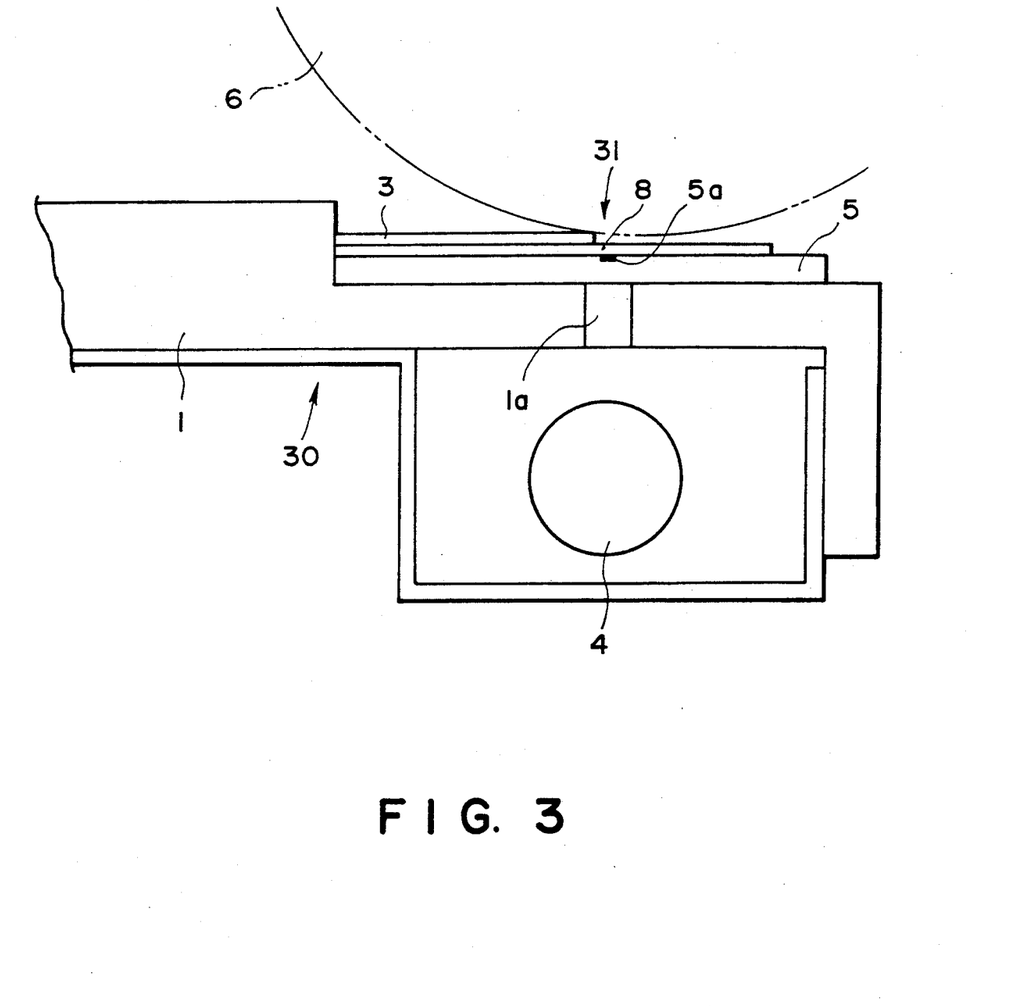
FIG. 3 is a cross-sectional view of the image sensor means.

FIGS. 2 and 3 are detailed views of the image sensor means 30 of FIG. 1. In these figures, the reference numeral 1 designates a sensor base, the reference numeral 2 denotes a photoelectric conversion element driving circuit substrate, the reference numeral 3 designates a low friction portion, the reference numeral 4 denotes an illuminating light source, and the reference numeral 6 designates a conveying roller for the originals 7. In these figures, the dimension of the sensor in the thickness direction thereof is enlarged and emphasized.

A cross-section of the sensor shown in FIG. 2 is shown in FIG. 3.

A sensor substrate 5 having a photoelectric conversion element 5a formed on the surface thereof is placed on the base 1 made of aluminum. The sensor substrate 5 is formed of a transparent material such as glass, and is designed such that the light of the illuminating light source 4 mounted under the aluminum base 1 passes through a slit 1a in the aluminum base to the surface of the original. At the lengthwisely outer side of the photoelectric conversion element 5a, there is provided the photoelectric conversion element driving circuit substrate 2 which is covered with a cover member, not shown.

The sensor substrate 5 is covered with a protective transparent member 8 having a thickness of the order of 50 μm so that the photoelectric conversion element 5a is protected from any extraneous force and the light from the illuminating light source is not intercepted.

The conveying roller 6 is rotated by a pulse motor, not shown, to convey the original 7 at a predetermined pitch while being urged against the protective transparent member 8 substantially just above the reading line of the sensor which is the reading portion.

A description will now be given of a case where the low friction portion 3 is absent. When the original 7 is between the reading portion 31 and the conveying roller 6, the rotational load of the conveying roller is the frictional force between the original 7 and the protective transparent member 8. This coefficient of friction is of the order of 0.3 to 0.6 and therefore, the rotational load torque is of the order of 300 gr.cm and at greatest, does not exceed 1 kg-cm.

Figure 4:
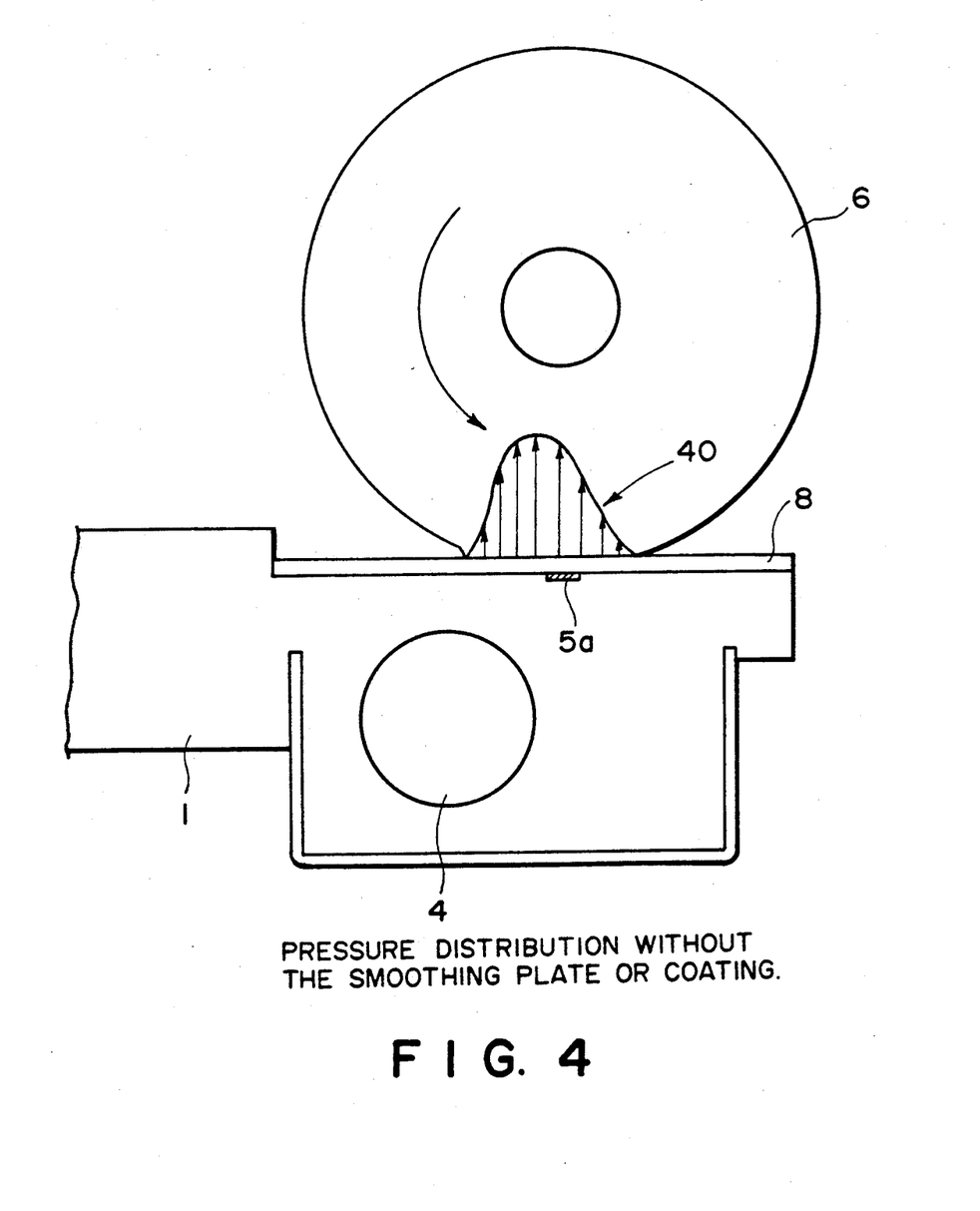
FIGS. 4, 5 and 6 show the deformation and the pressure distribution of a conveying roller.

However, during the time from after the apparatus is started with an original set on the tray 13 until the original is conveyed to the protective transparent member 8 which is at the reading portion 31, the rubber surface of the conveying roller 6 rotates while keeping intimate contact with the reading portion 31. The thus-caused deformation of the conveying roller 6 and the pressure distribution acting on the conveying roller 6 are shown in FIG. 4. The rotational load torque reaches 2 kg-cm or more, and sometimes exceeds 3 kg-cm.

So, the low friction portion 3 is provided on the protective transparent member 8 near the reading portion 31 of the sensor, and the conveying roller 6 is positively brought into contact with the low friction portion 3, whereby the rotational load can be made small.

As shown by the pressure distribution curve 40 in FIG. 4, when the conveying roller 6 formed of rubber is rotated, the pressure force on that side more adjacent to the paper feeding side than the line passing through the center of the roller 6 and the point of contact with the protective transparent member 8, i.e., that side more adjacent to the tray 13 than the reading line corresponding to the position right above the photoelectric conversion element 5a, becomes greater due to the elastic deformation of the rubber. Accordingly, the low friction portion 3, if provided on the paper feeding side, will provide a great pressure reduction.

The low friction portion 3 may be formed by coating the surface of the sensor 5 with fluorine resin. Alternatively, it may be formed by providing a coating on the reading line itself.

Figure 5:
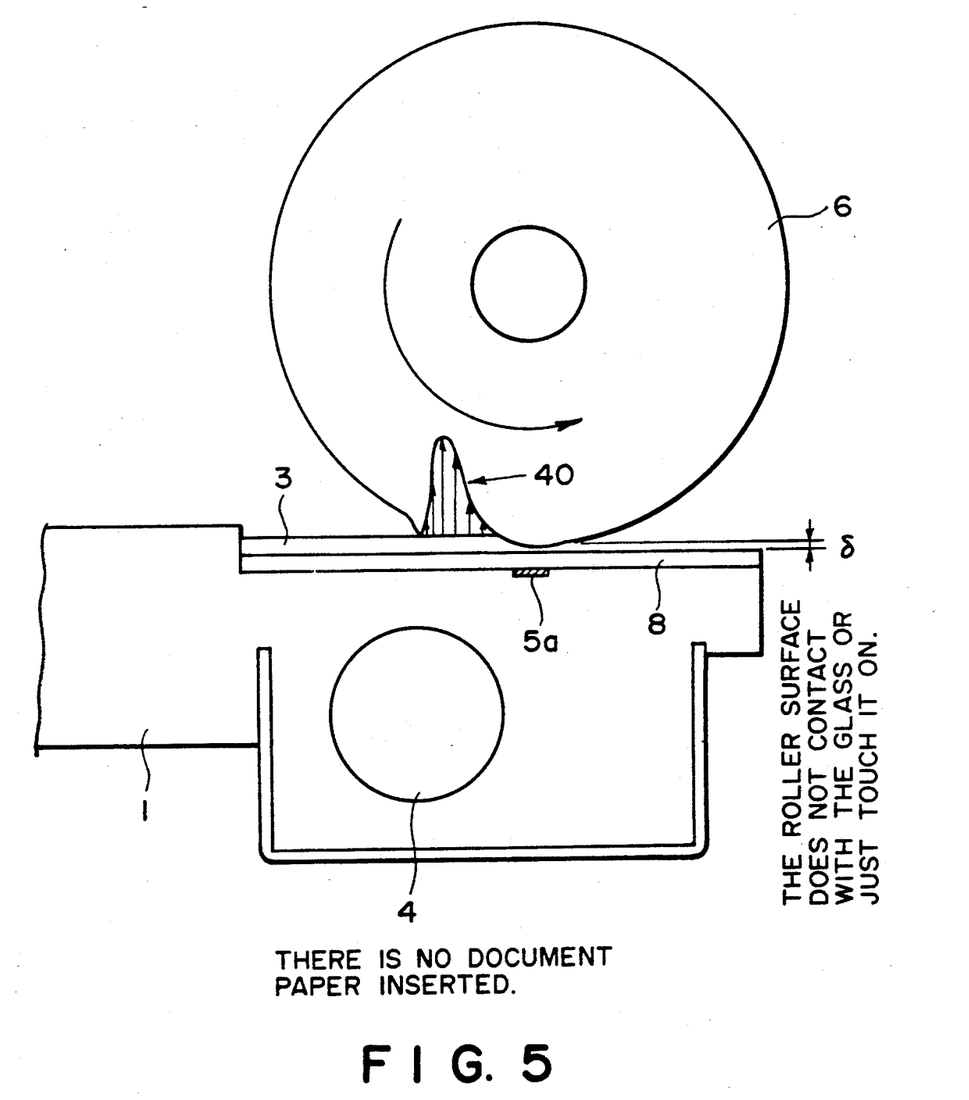

FIG. 5 shows the manner in which the rotating conveying roller 6 is deformed where the low friction portion 3 is provided. In the example shown in FIG. 5, the pressure distribution curve 40 is depicted only on the low friction portion 3 and a gap δ is formed between the conveying roller 6 and the protective transparent member 8. The low friction portion 3 may be made thinner or the conveying roller 6 may be formed of a soft material so that the conveying roller 6 may contact the protective transparent member 8 with a low pressure.

Figure 6:
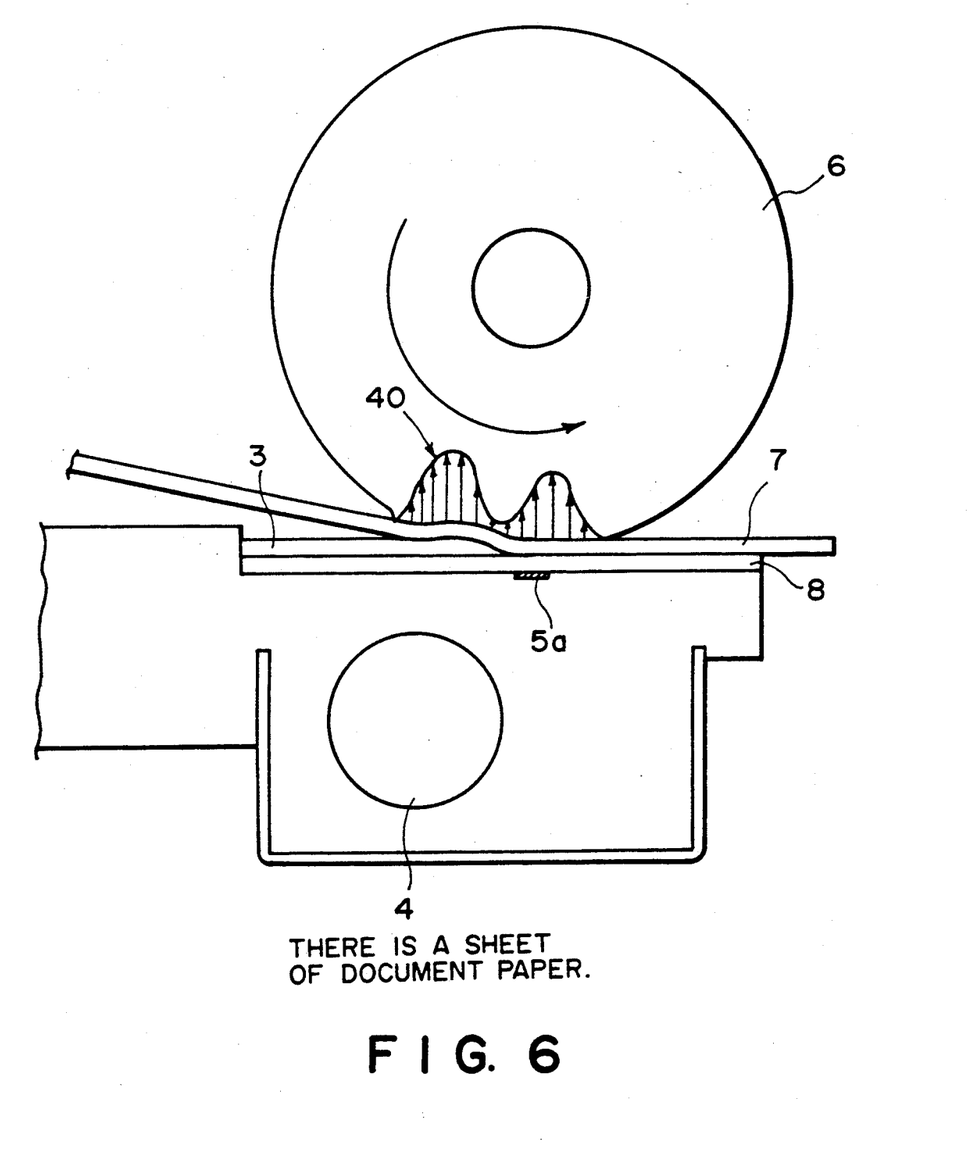

FIG. 6 shows the deformation of the conveying roller 6 and the pressure distribution curve 40 when the original 7 is conveyed in the construction of FIG. 5. By the deformation of the conveying roller 6, the original 7 is urged against that portion of the protective transparent member 8 which corresponds to the position right above the photoelectric conversion element 5a (the reading line).

The low friction portion may also be formed by attaching to the surface of the sensor 5 a sheet material having a tacky agent on the back surface and having a front surface of low friction, such as a Teflon tape having a thickness of 20 μm.

Although called the low friction portion, it is normally in sliding movement and therefore, its front surface may change, but there is the advantage that the low friction sheet material can be replaced with a new one.

Also, it may be difficult to attach the aforedescribed construction in the vicinity of the reading portion. So, it will be convenient to attach a sheet material 3b (FIG. 7), for example, to a very thin sheet metal 3a of great rigidity having a high degree of straightness of its end surfaces, or to provide a coating on the surface thereof and to attach it in the vicinity of the reading line.

Also, if the surface of the protective transparent member is coated with a transparent low friction, wear proof material, for example, UV coat or the like, alignment will become unnecessary and the number of parts will be reduced, and this is desirable.

While in the above-described embodiment, the low friction portion is provided upstream of the reading line with respect to the direction of conveyance, the low friction portion may be provided downstream of the reading line.

Figure 7:
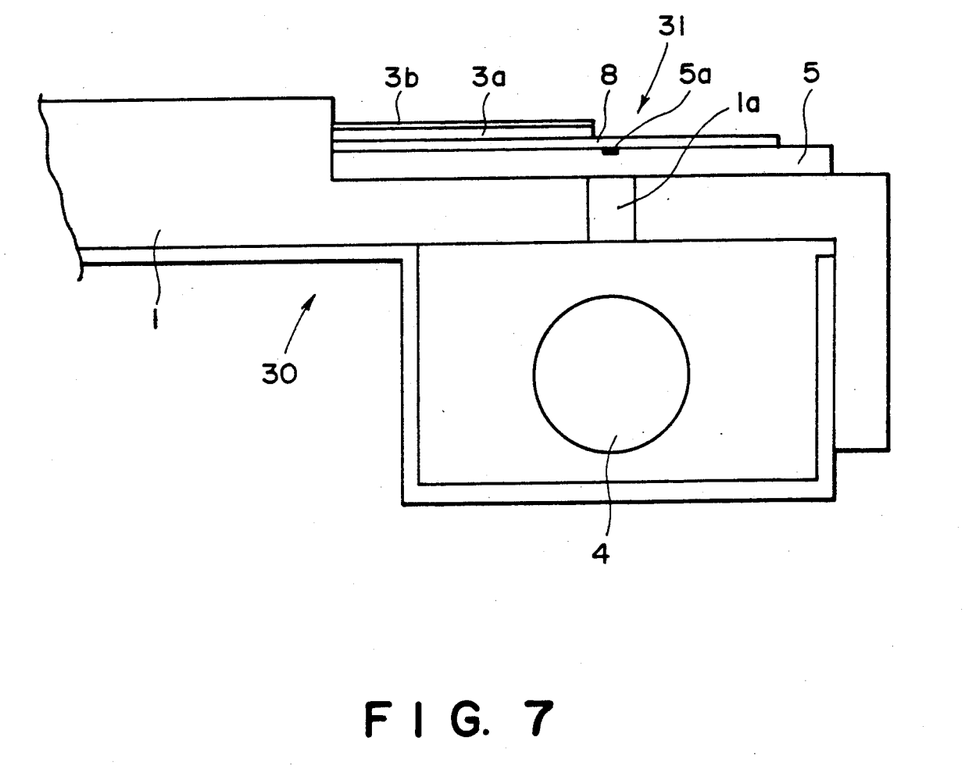
FIG. 7 shows another embodiment of the present invention.

The present invention is also applicable to an intimate contact type image reading apparatus using a lens array 32 (FIG. 7).

In the embodiment of FIG. 2, the photoelectric conversion element 5a is fitted in a recess formed in the sensor substrate 5, but such recess need not always be formed. That is, the photoelectric conversion element may be placed on a flat sensor substrate and a protective transparent plate may be attached thereon by a transparent adhesive agent. In such case, the gap formed between the sensor substrate and the protective transparent plate is filled with a layer of transparent adhesive agent.

The photoelectric conversion element may be protected by a transparent layer so as not to directly contact the original. For example, a transparent fluid protective agent may be applied to the photoelectric conversion element and solidified. Alternatively, the photoelectric conversion element may be embedded in a glass plate.

The material forming the low friction portion is not limited to the aforementioned Teflon, but a sheet of super-high molecular polyethylene may be adhesively secured. A vinyl tape, if attached, will also be effective. The glass plate forming the reading portion intimately contacts the roller made of rubber and creates a high frictional force, but any material having a surface rougher than the glass plate and not liable to intimately contact rubber could be applied for the low friction portion.

In any case, the material of the low friction portion can be chosen so that the coefficient of friction between the low friction portion and the conveying roller may be smaller than the coefficient of friction between the surface of the reading portion and the conveying roller.

The low friction portion is provided to thereby stabilize rotation of the conveying roller 6 of FIG. 1, whereby it is also possible to drive the conveying roller 6 and the feed roller 14 by a common motor.

What is claimed is:

1. An apparatus for reading an image on a sheet, comprising:
   conveying means for conveying the sheet;
   a transparent member having a surface for contacting said conveying means and a surface of the sheet conveyed by said conveying means;
   a photoelectric conversion element disposed in said transparent member or on a surface of said transparent member opposite to said surface which contacts the surface of the sheet; and
   a low friction portion formed on at least a portion of said surface of said transparent member which contacts said conveying means, said low friction portion being disposed at a location upstream of an area on said transparent member at which reading of the image is effected with respect to a direction of conveyance of the sheet.

2. An apparatus according to claim 1, wherein said conveying means includes a roller.

3. An apparatus according to claim 1, wherein said photoelectric conversion element is in contact with said transparent member.

4. An apparatus according to claim 1, wherein said photoelectric conversion element is embedded in said transparent member.

5. An apparatus according to claim 1, further comprising a lens array disposed between said transparent member and said photoelectric conversion element.

6. An apparatus according to claim 1, wherein said low friction portion comprises a low friction material coating formed on said transparent member.

7. An apparatus according to claim 1, wherein said low friction portion comprises a tape of low friction material attached onto said transparent member.

8. An apparatus according to claim 1, wherein a coefficient of friction between said conveying means and said low friction portion is smaller than a coefficient of friction between said conveying means and said transparent member.

9. An apparatus according to claim 1, wherein the sheet conveyed by said conveying means contacts said transparent member as well as said low friction portion.

10. An apparatus according to claim 1, wherein a portion of the surface of said transparent member which contacts the sheet conveyed by said conveying means is opposed to said photoelectric conversion element.

11. An image reading apparatus according to claim 1, wherein said low friction portion includes a coating of fluorine resin.

12. An image reading apparatus according to claim 11, wherein said conveying means includes a rubber roller, and wherein said transparent member includes a glass plate.

13. An image reading apparatus according to claim 1, wherein said low friction portion comprises a teflon tape.

14. An image reading apparatus according to claim 13, wherein said conveying means includes a rubber roller, and wherein said transparent member includes a glass plate.

15. An image reading apparatus according to claim 14, wherein said low friction portion comprises a high polymer polyethylene.

16. An image reading apparatus according to claim 15, wherein said conveying roller includes a rubber roller, and wherein said transparent member includes a glass plate.

17. An image reading apparatus according to claim 1, wherein said low friction portion comprises a vinyl tape.

18. An image forming apparatus according to claim 17, wherein said conveying means includes a rubber roller, and wherein said transparent member includes a glass plate.

19. An apparatus for reading an image on a sheet, comprising:
reading means having a contact surface contacting a surface of the sheet, for reading an image formed on the surface of the sheet, said image being transmitted through said contact surface;
conveying means for conveying the sheet while urging the sheet against the contact surface of said reading means; and
a low friction surface formed at a location whereat said contact surface is opposed to said conveying means, said low friction surface being disposed at a location upstream of an area on said contact surface at which reading of the image is effected with respect to a direction of conveyance of the sheet.

20. An apparatus according to claim 19, wherein said reading means includes a transparent member which contacts the sheet conveyed by said conveying means.

21. An apparatus according to claim 20, wherein said reading means includes a lens array disposed adjacent said transparent member.

22. An apparatus according to claim 20, wherein said low friction surface comprises a low friction material coating formed on said transparent member.

23. An apparatus according to claim 20, wherein said low friction surface comprises a low friction material adhesively secured to said transparent member.

24. An apparatus according to claim 20, wherein a coefficient of friction between said low friction surface and said conveying means is smaller than a coefficient of friction between said transparent plate and said conveying means.

25. An apparatus according to claim 20, further comprising a photoelectric conversion element disposed on said transparent member or a surface of said transparent member opposite to the surface which contacts the sheet.

26. An apparatus according to claim 25, wherein a portion of said transparent member which contacts the sheet conveyed by said conveying means is opposed to said photoelectric conversion element.

27. An apparatus according to claim 20, wherein said transparent member includes a transparent plate.

28. An apparatus according to claim 20, wherein the sheet conveyed by said conveying means contacts said transparent member as well as said low friction portion.

29. An image reading apparatus according to claim 19, wherein said low friction surface comprises a coating of a fluorine resin.

30. An image reading apparatus according to claim 29, wherein said conveying means includes a rubber roller, and wherein said reading means includes a glass plate.

31. An image reading apparatus according to claim 19, wherein said low friction surface comprises a teflon tape.

32. An image reading apparatus according to claim 31, wherein said conveying means includes a rubber roller, and wherein said reading means includes a glass plate.

33. An image reading apparatus according to claim 19, wherein said low friction surface comprises a high polymer polyethylene.

34. An image reading apparatus according to claim 33, wherein said conveying means includes a rubber roller, and wherein said reading means includes a glass plate.

35. An image reading apparatus according to claim 19, wherein said low friction surface comprises a vinyl tape.

36. An image reading apparatus according to claim 35, wherein said conveying means includes a rubber roller, and wherein said reading means includes a glass plate.

37. An apparatus for reading an image on a sheet, comprising:
a transparent member for contacting a surface of the sheet;
reading means for reading the image formed on the surface of the sheet, said image being transmitted through a predetermined area of said transparent member;
conveying means for conveying the sheet while urging the sheet against said transparent member; and
a low friction surface formed upstream of said predetermined area of said transparent member with respect to a direction of conveyance of the sheet, a coefficient of friction between said low friction surface and said conveying means being smaller than a coefficient of friction between said conveying means and said transparent plate.

38. An apparatus according to claim 37, further comprising a photoelectric conversion element disposed on said transparent member or fixed to a surface of said transparent member opposite the surface contacting the sheet.

39. An apparatus according to claim 38, wherein a portion of said transparent member which contacts the sheet conveyed by said conveying means is opposed to said photoelectric conversion element.

40. An apparatus according to claim 37, wherein said low friction surface comprises a low friction material coating formed on said transparent member.

41. An apparatus according to claim 37, wherein said low friction surface comprises a low friction material adhesively secured to said transparent member.

42. An apparatus according to claim 37, wherein the sheet conveyed by said conveying means contacts said transparent member as well as said low friction portion.

43. An image reading apparatus according to claim 42, wherein said image sensor has a transparent member which contacts the sheet conveyed by said conveying means.

44. An image reading apparatus according to claim 43, further comprising a photoelectric conversion element disposed on said transparent member or a surface of said transparent member opposite the surface which contacts the sheet.

45. An image reading apparatus according to claim 44, wherein a portion of said transparent member contacting the sheet conveyed by said conveying means is opposed to said photoelectric conversion element.

46. An image reading apparatus according to claim 37, wherein said low friction surface comprises a vinyl tape.

47. An image reading apparatus according to claim 46, wherein said low friction means includes a rubber roller, while said reading means includes a glass plate.

48. An apparatus for reading an image of a sheet, comprising:
   first conveying means for conveying the sheet;
   a first transparent member having a first surface contacting a surface of the sheet conveyed by said first conveying means;
   a second transparent member disposed on a side of said first transparent member opposite to said first surface which contacts the surface of the sheet;
   a photoelectric conversion element disposed on or in proximity to said first transparent member, for reading an image formed on the surface of the sheet which is transmitted through a predetermined reading area of said first transparent member;
   second conveying means for imparting a conveying force to the sheet while urging the sheet against said first transparent member;
   illuminating means for illuminating the surface of the sheet through said first transparent member and through said second transparent member; and
   a low friction member disposed at a portion of said first transparent member which contacts said second conveying means, said low friction member being disposed at a location upstream of the reading area with respect to the sheet conveying direction.

49. An image reading apparatus, comprising:
   an image sensor having a contact surface adapted to contact a sheet surface, for reading an image formed on the sheet surface, said image being transmitted through said contact surface, said image sensor including a lens array adjacent said contact surface;
   conveying means for conveying the sheet by pressing it against the contact surface of said image sensor; and
   a low friction surface formed on the contact surface at a position opposing said conveying means.

50. An image reading apparatus according to claim 49, wherein said low friction surface comprises a low friction material coating formed on said contact surface.

51. An image reading apparatus according to claim 49, wherein said low friction surface comprises a low friction material adhered to said contact surface.

52. An image reading apparatus according to claim 49, wherein a coefficient of friction between said low friction surface and said conveying means is smaller than a coefficient of friction between said contact surface and said conveying means.

53. An image reading apparatus according to claim 49, wherein the sheet conveyed by said conveying means contacts said contact surface as well as said low friction surface.

* * * * *

UNITED STATES PATENT AND TRADEMARK OFFICE
CERTIFICATE OF CORRECTION

PATENT NO. : 5,070,415
DATED : December 3, 1991
INVENTOR(S) : Hiroaki Matsumoto

It is certified that error appears in the above-identified patent and that said Letters Patent is hereby corrected as shown below:

IN THE DRAWINGS

FIGURE 5

Add a right-hand boundary to member 3 substantially above element 5a.

FIGURE 7

Add a glass lens array 3 between element 8 and element 5a, with a corresponding reference numeral 32 and lead line.

COLUMN 1

Line 25, "and" should be deleted;
Line 39, "used" should read --is used--; and
Line 42, "laid-Open" should read --Laid-Open--.

UNITED STATES PATENT AND TRADEMARK OFFICE
CERTIFICATE OF CORRECTION

PATENT NO. : 5,070,415
DATED : December 3, 1991
INVENTOR(S) : Hiroaki Matsumoto

It is certified that error appears in the above-identified patent and that said Letters Patent is hereby corrected as shown below:

COLUMN 4

Line 3, "lengthwisely" should read --lengthwise--.

Signed and Sealed this

Eighth Day of June, 1993

Attest:

MICHAEL K. KIRK

*Attesting Officer*   *Acting Commissioner of Patents and Trademarks*